(12) United States Patent
Raghavan et al.

(10) Patent No.: US 8,761,373 B1
(45) Date of Patent: Jun. 24, 2014

(54) SYSTEM AND METHOD FOR DETERMINING IVR APPLICATION FLOW FROM CUSTOMER-SERVICE CALL RECORDINGS

(75) Inventors: Sridhar Raghavan, Santa Clara, CA (US); Sundararajan Srinivasan, Santa Clara, CA (US); Karunakar Rao Chemudugunta, Milpitas, CA (US)

(73) Assignee: Nuance Communications, Inc., Burlington, MA (US)

( * ) Notice: Subject to any disclaimer, the term of this patent is extended or adjusted under 35 U.S.C. 154(b) by 330 days.

(21) Appl. No.: 13/252,193

(22) Filed: Oct. 3, 2011

(51) Int. Cl.
*H04M 3/00* (2006.01)

(52) U.S. Cl.
USPC . 379/265.03; 379/111; 379/133; 379/201.01; 379/221.15; 379/266.1; 704/270.1; 704/275; 709/201

(58) Field of Classification Search
USPC .............................. 370/259–271, 351–356; 379/88.01–88.04, 93.12, 379/110.01–112.1, 133–139, 221.15, 379/265.01–266.1, 201.01; 455/412.1–426.2, 456.1–466, 455/550.1–560, 575.1–575.9, 90.1–90.3; 704/270–278; 709/201–207, 217–248
See application file for complete search history.

(56) References Cited

U.S. PATENT DOCUMENTS

| | | | |
|---|---|---|---|
| 5,740,233 A * | 4/1998 | Cave et al. ............... | 379/112.06 |
| 6,192,108 B1 * | 2/2001 | Mumford et al. ......... | 379/9 |
| 6,243,680 B1 * | 6/2001 | Gupta et al. .............. | 704/260 |
| 6,246,982 B1 * | 6/2001 | Beigi et al. ............... | 704/238 |
| 6,380,937 B1 | 4/2002 | Dong et al. | |
| 6,493,703 B1 | 12/2002 | Knight et al. | |
| 6,778,982 B1 | 8/2004 | Knight et al. | |
| 6,842,504 B2 * | 1/2005 | Mills et al. ............... | 379/67.1 |
| 6,868,525 B1 | 3/2005 | Szabo | |
| 6,934,935 B1 | 8/2005 | Bennett et al. | |
| 7,039,166 B1 * | 5/2006 | Peterson et al. .......... | 379/88.18 |
| 7,047,486 B1 | 5/2006 | Nagao | |
| 7,360,151 B1 | 4/2008 | Froloff | |
| 7,366,780 B2 | 4/2008 | Keller et al. | |
| 7,401,087 B2 | 7/2008 | Copperman et al. | |
| 7,657,005 B2 * | 2/2010 | Chang ....................... | 379/88.02 |
| 8,370,362 B2 | 2/2013 | Szabo | |
| 8,380,696 B1 | 2/2013 | Rogers et al. | |
| 8,401,156 B1 * | 3/2013 | Milro et al. .............. | 379/88.01 |
| 8,515,736 B1 | 8/2013 | Duta | |
| 8,589,373 B2 | 11/2013 | Mayer | |
| 2003/0204404 A1 | 10/2003 | Weldon et al. | |
| 2003/0233224 A1 | 12/2003 | Marchisio et al. | |
| 2004/0107088 A1 | 6/2004 | Budzinski | |
| 2004/0252646 A1 | 12/2004 | Adhikari et al. | |
| 2005/0114794 A1 | 5/2005 | Grimes et al. | |
| 2006/0155662 A1 | 7/2006 | Murakami et al. | |
| 2008/0010280 A1 | 1/2008 | Jan et al. | |
| 2008/0084971 A1 * | 4/2008 | Dhanakshirur ........... | 379/88.01 |
| 2008/0300870 A1 * | 12/2008 | Hsu et al. ................. | 704/231 |
| 2008/0304632 A1 | 12/2008 | Catlin et al. | |
| 2009/0245493 A1 * | 10/2009 | Chen et al. ............... | 379/112.06 |

(Continued)

*Primary Examiner* — Hemant Patel
(74) *Attorney, Agent, or Firm* — Lessani Law Group, PC

(57) ABSTRACT

A system and method is provided for automatically generating an interactive voice response (IVR) application flow from recorded audio files of calls to or from an IVR system. The method includes identifying an IVR state sequence for each of a plurality of calls from recorded audio files of the calls. The N most common state sequences are identified for the IVR system for the plurality of calls. An application flow is then displayed for the IVR application using the N most common state sequences.

17 Claims, 6 Drawing Sheets

(56) References Cited

U.S. PATENT DOCUMENTS

| | | |
|---|---|---|
| 2009/0274068 A1 | 11/2009 | Kostner et al. |
| 2010/0122214 A1 | 5/2010 | Sengoku |
| 2010/0205180 A1 | 8/2010 | Cooper et al. |
| 2010/0312782 A1 | 12/2010 | Li et al. |
| 2010/0313157 A1 | 12/2010 | Carlsson et al. |
| 2011/0200181 A1 | 8/2011 | Issa et al. |
| 2011/0218983 A1 | 9/2011 | Chaney et al. |
| 2011/0238409 A1 | 9/2011 | Larcheveque et al. |
| 2011/0238410 A1 | 9/2011 | Larcheveque et al. |
| 2011/0276190 A1 | 11/2011 | Lillis et al. |
| 2013/0139111 A1 | 5/2013 | Grimes et al. |
| 2013/0170631 A1 | 7/2013 | Raghavan et al. |

* cited by examiner

| Clustered Transcripts | Longest Transcripts | Raw Transcripts | | | |
|---|---|---|---|---|---|
| Clustered Transcription List | | Playback 0% | | Done | |
| Transcript | | | Prompt Label | Prompt Type | |
| you can i understand you wanna talk to an agent you know i can probably | | | USE_WEBSITE | 🎵 | 64 |
| oh i checked your account and as of this morning your payment $[d] was due on | | | PLAY_BALANCE | 🎵 | 55 |
| no how can i help you you can say make a payment manage my accoun | Highest Quality Transcript | | | | 52 |
| now what can i do for you you can say make a payment manage my acco | | | MAIN_MENU | 🎵 | 40 |
| oh i still didn't understand to make a payment or find locations and metro | | | MENU_FALLBACK | | 37 |
| just as a reminder your payment $[d] is due on the [d] | | | PLAY_BALANCE | 🎵 | 29 |
| the next one is authorized to ----dealer for [d] avenue, brooklyn | | | PLAY_LOCATION | 🎵 | 28 |
| oh i pulled up your account and it looks like your payment $[d] is due on | | | PLAY_BALANCE | 🎵 | 28 |
| oh i still didn't understand to me | | | CANNOT_UNDERSTAND | | 27 |
| to help you with that i [d] need your eight digit---- security code you | | | ASK_SECURITY_CODE | 🎵 | 27 |
| sorry i didn't hear you you can just say yes or no you want to pay now | | | CANNOT_UNDERSTAND | 🎵 | 26 |
| here's what i have your on the $[d] a month plan and your payment $[d] | | | PLAN_DESCRIPTION | | 25 |
| sorry i didn't hear you please say credit card debit card----payment card | | | PAYMENT_OPTIONS | 🎵 | 24 |
| please say make a payment or press one to manage my account will press | | | MENU_FALLBACK | | 22 |
| and you can make a payment now using a credit card debit card or a -- | | | PAYMENT_OPTIONS | 🎵 | 22 |
| but if i do not and if i mean when you get this thing you | | | | 🎵 | 22 |
| sorry i didn't get that just say yes or no you want to pay now by credit | | | PAYMENT_OPTIONS | 🎵 | 22 |

FIG. 5

SYSTEM AND METHOD FOR DETERMINING IVR APPLICATION FLOW FROM CUSTOMER-SERVICE CALL RECORDINGS

BACKGROUND OF THE INVENTION

1. Field of the Invention

This invention relates generally to interactive voice response systems and, more particularly, to determining IVR application flow from customer-service call recordings.

2. Description of the Background Art

In order to optimize an existing interactive voice response (IVR) system, a developer may need to analyze its application flow. In many already established IVR systems, however, the developer may not know the entire application flow of the system, or even some of the more common state sequences. The most efficient means of reconstructing this information would be to process the information from the log files. This option, however, may not always be available. Some systems may not have stored a text log, the developer may not have access to the log files, or the log files may not be in the proper format and, therefore, either not capable of being processed by the developer or requiring a high cost to process. Therefore, there is a need for a method for determining IVR application flow that does not require log files.

SUMMARY OF THE INVENTION

The present invention is directed to a system and method for automatically generating an interactive voice response (IVR) application flow from recorded audio files of calls to or from an IVR system.

An IVR state sequence is identified for each of a plurality of calls from recorded audio files of the calls. For each call, such identification includes extracting speech segments from an audio recording of the IVR portion of the call, converting the extracted speech segments to text, and classifying each segment with an IVR state to obtain an IVR state sequence for the call. The N most common state sequences are identified for the IVR system among the plurality of calls, where N is greater than or equal to one. An application flow is then displayed for the IVR application using the N most common state sequences.

In one embodiment, a semantic classifier is used in the classification step to automatically classify each the segments. Each classification is associated with a confidence level. If the confidential level for every classified segment in a call is above a predetermined threshold, then the sequence of IVR states generated by the classifier becomes the IVR state sequence for the call. If the confidence level does not meet the minimum threshold, the call is designated as requiring manual supervision and labeling.

In certain embodiments, a user interface is provided through which a user can manually label segments to build a model for the semantic classifier. The software used to implement the user interface has the functionality of clustering the speech segments into groups based on semantic meaning, displaying the clusters in the interface, and enabling a user to label each of the clusters with an IVR state. A hierarchical, bisecting K-Means algorithm may be used to perform the clustering. Clustering the speech segments can include assigning weights to individual words in the speech segments such that transcripts with similar words are clustered together while weighing down frequently-used words. The frequency in which words are used is determined by building word statistics from a generic text database.

In certain embodiments, identifying the N most common state sequences includes creating N clusters of call sequences such that calls with similar IVR state sequences are grouped together and where N is greater than 1. From each cluster, a state sequence is selected that is closest to the center of the cluster. The selected state sequences are used as the N most common state sequences. A hierarchical, bisecting K-Means algorithm may be used to perform the clustering.

BRIEF DESCRIPTION OF THE DRAWINGS

FIG. 5 illustrates an exemplary implementation of a user interface that enables a user to manually label IVR prompts with an IVR state.

DETAILED DESCRIPTION OF THE PREFERRED EMBODIMENTS

Figure 1:
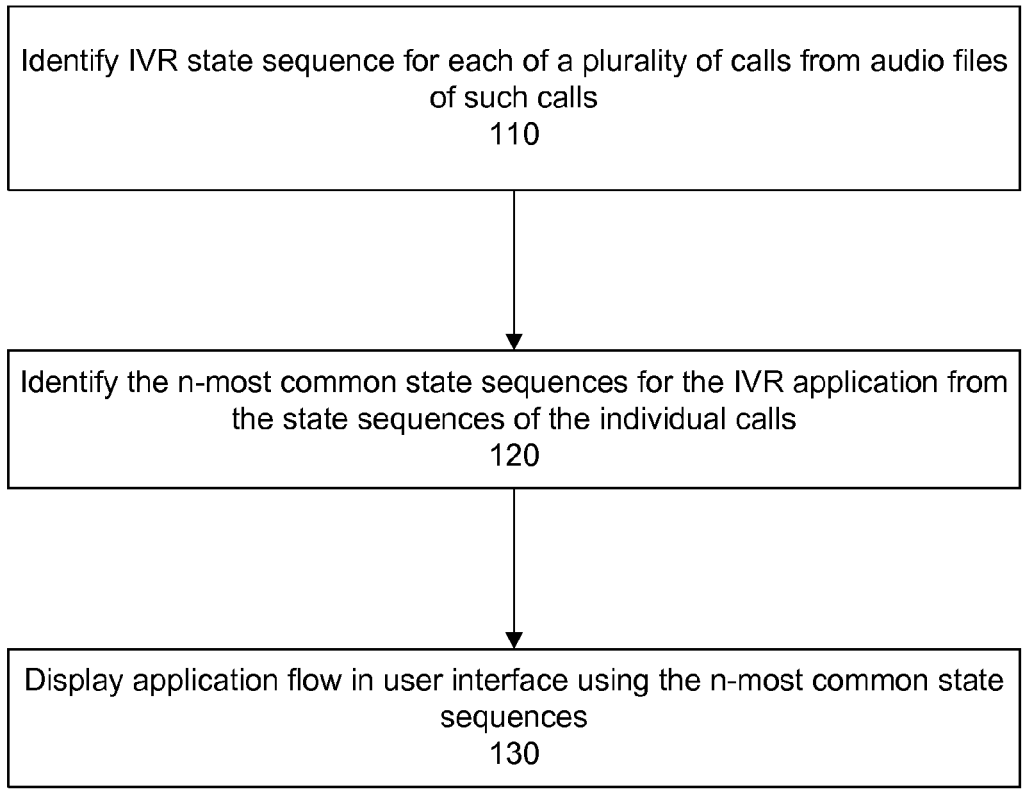
FIG. 1 is a flowchart that illustrates a method for automatically generating an IVR application flow from audio recording of customer-service calls.

A developer of an interactive voice response (IVR) system may need knowledge of the system's call flow in order to adjust or optimize the system's processes. While ideally, this information could be obtained by analyzing the system's text logs, text logs of the customer's calls may not always be available or cost-effective to analyze. As a result, other methods are needed. FIG. 1 illustrates a method of the present invention in which state sequences are ascertained from customer-service call recordings to create a visual representation of the IVR system's application flow.

In an initial step, a computer system processes the audio files of a plurality of calls and identifies the state sequence for each call (step 110). Next, from the state sequences of each individual call, the system identifies the N-most common state sequences among the plurality of calls (step 120). Finally, the system displays the application flow in the user interface based on the N-most common state sequences (step 130). In the preferred embodiment, the audio files are full call recordings, in stereo format, of the IVR calls.

Figure 2:
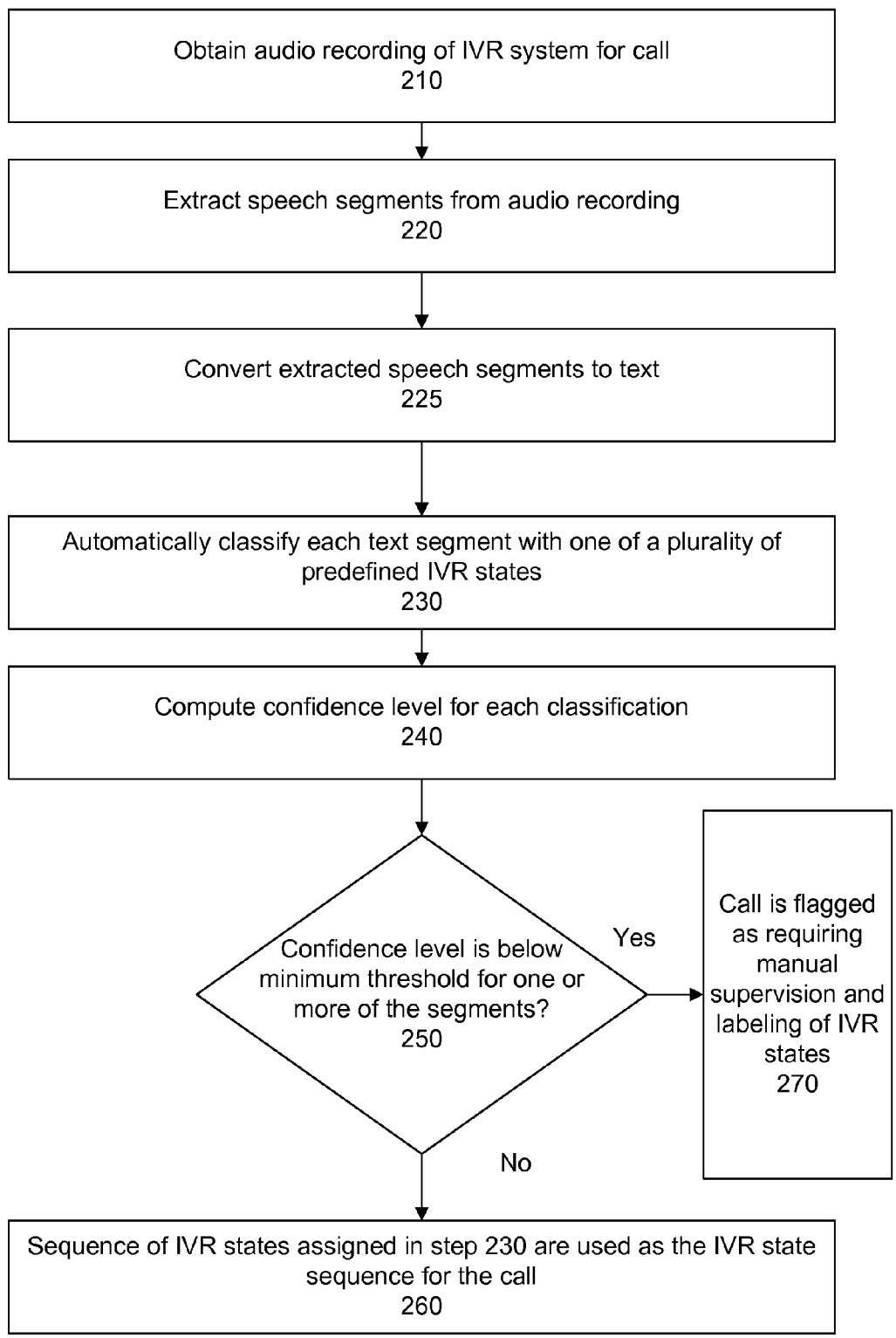
FIG. 2 is a flowchart that illustrates a method for determining a state sequence for a single call.

FIG. 2 illustrates a more detailed look at the method for determining the state sequence of a single call (See step 110 of FIG. 1). The system first must obtain an audio recording of the call within the IVR system (step 210). Some systems may be set up to record every call that is placed to the system. Other systems may record a sample set. The calls may be recorded in any format within the scope of the present invention. For example, the system can make use of uncompressed audio files (e.g., WAV), lossless compression files (e.g., FLAC), or lossy compression files (e.g., MP3). The entire call may be recorded, including both the IVR prompts and the customer response. In a preferred embodiment, the IVR prompts and the customer response are recorded in stereo format, such that the prompts and responses are on separate channels.

Next, the speech segments from the audio recordings of the IVR portion are extracted from the audio files by identifying the speech portions and discarding any silences, noise, and other non-speech sections of the audio stream (step 220). The extracted speech segments are the IVR prompts in the call. The extracted speech segments are then converted into text using a transcription engine that can automatically transcribe the IVR prompts (step 225). In certain embodiments, the transcription engine may be operatively coupled to a manual transcription module that enables the user to verify and correct the automatic transcriptions as needed. Each text segment is then automatically classified with one of a plurality of predefined IVR states (step 230). Examples of predefined IVR states may include a "Welcome" state, a "Main Menu" state, a "Payment Option" state, or many more. A method for building the semantic statistical model used to perform the automated classification is described in more detail with respect to FIG. 3.

After automatically classifying each text segment with an IVR state, the system will compute the confidence level for each classification (step 240) and determine if the confidence level is above a minimum threshold for each of the classified segments (step 250). If the confidence level is above the minimum threshold for each classified segment, the sequence of IVR states generated in step 230 (as a result of classifying the segments with predefined IVR states) is used as the IVR state sequence for the call (step 260). If, however, the confidence level of the classification is below the minimum threshold for one or more segments, the call recording is flagged as requiring manual supervision and labeling in accordance with FIG. 3 (step 270). Each time IVR prompts are manually labeled with an IVR state sequence, the semantic classifier is updated to improve the ability of the classifier to classify future prompts with a predefined IVR state.

Figure 3:
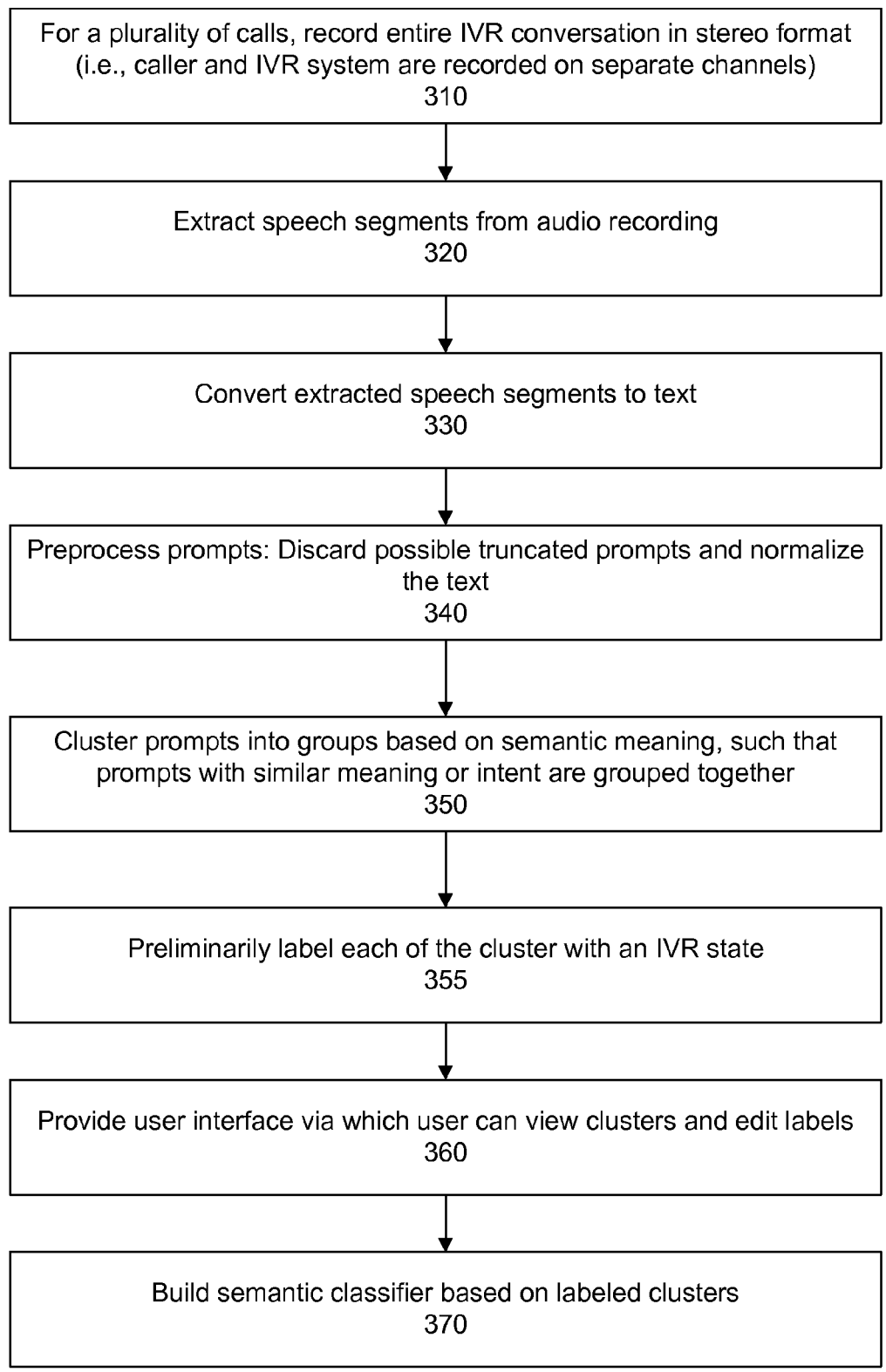
FIG. 3 is a flowchart that illustrates a method for building an automated semantic classifier.

FIG. 3 illustrates the method for building a semantic statistical model for the semantic classifier to enable the semantic classifier to automatically classify IVR prompts with an IVR state. Similar to FIG. 2, the model building method begins with recording entire IVR calls in stereo format (step 310), extracting the speech segment from the audio recording of the IVR portion (step 320), and converting the extracted speech segments to text (step 330). The system next takes the prompts and "pre-processes" them (step 340). Pre-processing includes discarding possible truncated prompts to increase efficiency. For example, if there is a set of similar prompts where some of the prompts have been interrupted or truncated, the system would extract the unique longest prompt from the set of prompts and discard the truncated prompts. Furthermore, a set of prompts may be similar except for having unique customer information, such as names or numbers. In this situation, the system would "normalize" or remove the unique text and replace the text with a static value such that the similar set of prompts may be clustered together for increased efficiency.

The pre-processed prompts are then clustered together into groups based on semantic meaning, such that prompts with similar meaning or intent are grouped together (step 350). For example, in one embodiment, IVR prompts are broken down into words and grouped into clusters of IVR prompts. Frequently-used words are assigned a lower weight than infrequently-used words. In the preferred embodiment, the frequency in which words are used is determined by building word-frequency statistics from a large, generic text database. For example, word-frequency statistics may be ascertained from a news website, such as www.cnn.com. Word-frequency statistics derived from a large, generic text database are more accurate than word-frequency statistics derived from the IVR prompts alone, as the IVR prompts are a much smaller domain of words.

In one embodiment, the IVR prompts are grouped into clusters using a hierarchical, bisecting K-Means clustering algorithm. This algorithm involves starting with a single cluster containing all the extracted IVR prompts and then splitting the clusters progressively into smaller clusters until a desired number of clusters is reached.

After clustering the prompts into groups, the system preliminarily labels each group with an IVR state (step 355). The developer then has the opportunity to view the labeled clusters on a user interface (see e.g., FIG. 5) and approve or edit the clusters and assigned labels 360. Finally, the semantic classifier is built based on the labeled clusters 370.

Figure 4:
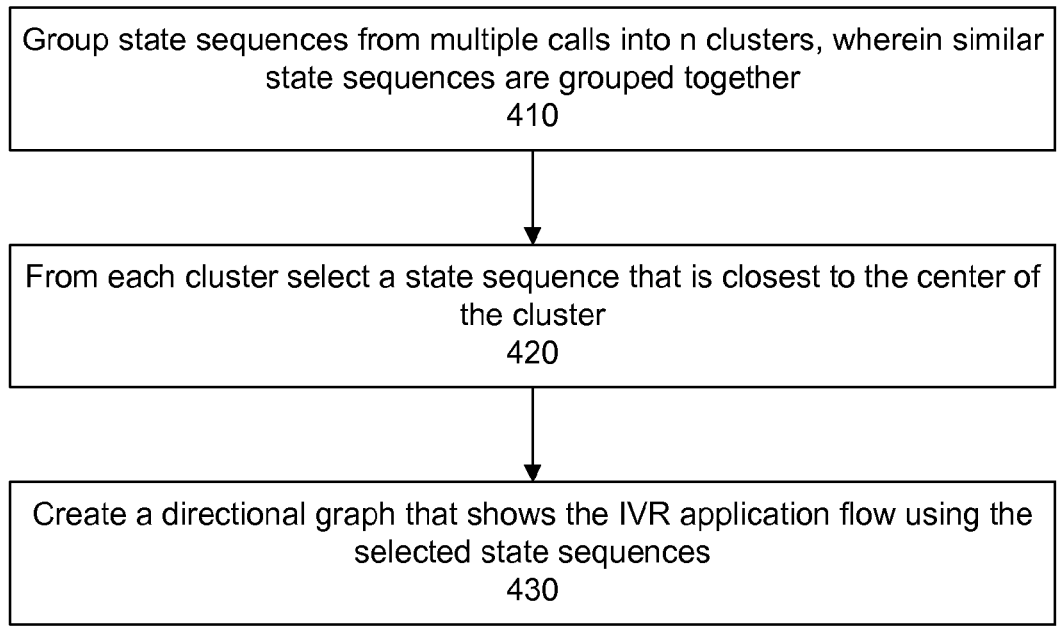
FIG. 4 is a flowchart that illustrates a method for determining the N-most common call state sequences in the plurality of calls.

FIG. 4 illustrates the method by which the system determines the N-dominant state sequences for the plurality of call. The system groups the state sequences of multiple calls into N clusters, wherein calls with similar state sequences are grouped together (step 410). For example, in one embodiment, a hierarchical, bisecting K-Means clustering algorithm is used to group the call state sequences into groups. This algorithm involves starting with a single cluster containing all the IVR state sequences observed in the calls and then splitting the clusters into progressively smaller clusters until a desired number of clusters is reached. Each cluster will contain a set of calls that have similar state sequences.

After the call state sequences have been grouped into clusters, the best candidate from each cluster (i.e., the state sequence closest to the center of the cluster) is selected to represent a single dominant path for the IVR application call flow (step 420). Finally, a directional graph (see e.g., FIG. 6) is created that shows the IVR application flow using the selected state sequences (step 430). If there are N clusters, there will be N paths displayed in the directional graph.

FIG. 5 illustrates an implementation of via which a user can view and label clusters of IVR prompts in accordance with step 360 in FIG. 3. As a person skilled in the art would understand, the user interface can be designed in any number of ways and still be within the scope of the present invention. The user interface has three views: a Clustered Transcript view 500, a Longest Transcript view 505, and a Raw Transcript view 510. The Clustered Transcript view 500 has a Transcript section 515, which lists the representative segment (i.e., IVR prompt) from each cluster. In one embodiment, the representative segment is determined by choosing the segment closest to the center of the cluster. The Clustered Transcript view also has a Prompt Label section 520, which lists the label assigned to each of the clusters. As described above, the user can manually edit the labels. It may also have a Prompt Type section 525, which is a description or annotation of the type of prompt corresponding to each of the clusters. Examples may include Introduction Prompt, Confirmation Prompt, Advertisement Prompt, General Prompt, Login Prompt, etc. The number of segments per cluster is displayed at the end of each row 530.

To aid the developer in the review, editing, and/or approval of the clustered transcripts, the developer is able to utilize a set of functional tools at the top of the user interface. The developer may employ the audio controls 535 that function to play, rewind, fast-forward, and stop the recording of the representative segment from each cluster. This allows the user to review the audio file, click on the representative segment from among the Transcript section 515 and edit the representative segment, as necessary. The user interface also provides a playback status bar 540, which indicates how much of the segment has been played back to the listener. When a particular representative segment, its prompt label, and prompt type have been reviewed and approved, the developer may press the "Done" button 560 and an indication, such as a green check mark, will be displayed corresponding to the highlighted row.

The Longest Transcript view 505 is similar to the Clustered Transcript view 500 in appearance and functionality, except instead of listing the state sequences closest to the center of the cluster in the Transcript section 515, it lists the longest prompt from a set of similar prompts. In contrast, the Raw Transcript view 510 lists the segments individually without clustering.

Figure 6:
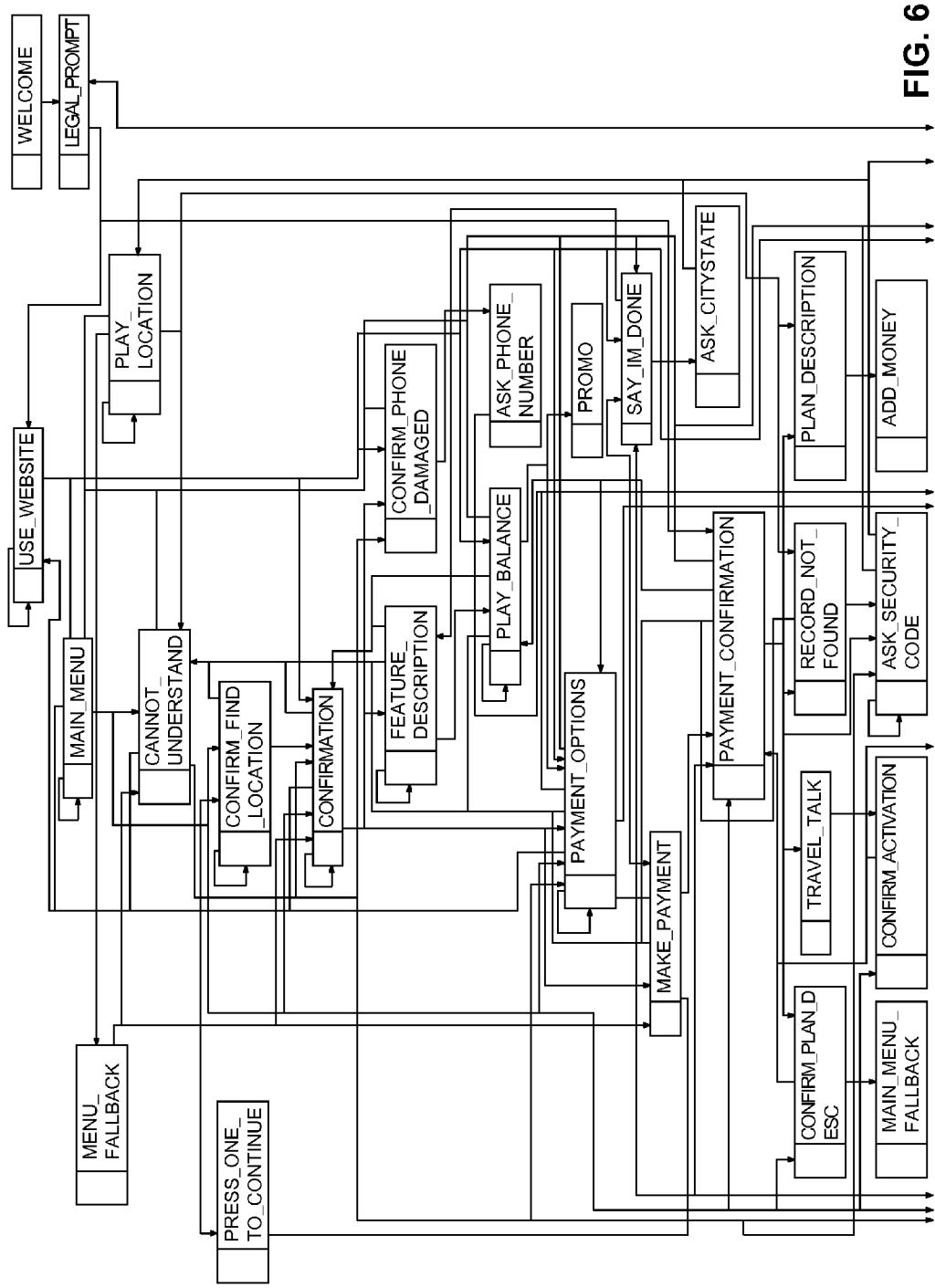
FIG. 6 illustrates an exemplary visual representation of a partial IVR application flow.

FIG. 6 illustrates an example of a directional graph that shows an IVR application flow. In this case, the figure shows only a portion of the flow, as the entire flow does not fit on one page. As a person skilled in the art would understand, the IVR application flow may be displayed in other formats besides a directional graph.

The methods described with respect to FIGS. 1-4 are embodied in software and performed by a computer system executing the software. A person skilled in the art would understand that a computer system has a memory or other physical storage medium for storing software instructions and one or more processors for executing the software instructions. The computer system may have access to a database which stores audio and text files.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for automatically generating an IVR application flow from recorded audio files of calls to or from an IVR system, the method comprising:
creating a statistical semantic model for IVR prompts by extracting speech segments from audio recordings of an IVR portion of a first set of calls, converting the extracted speech segments to text, clustering the speech segments based on semantic meaning, displaying the clusters in a user interface, enabling a user to label each of the clusters with an IVR state, and building a statistical semantic model based on the labeled clusters;
identifying an IVR state sequence for each of a second set of calls from recorded audio files of said calls, wherein, for each call in the second set, such identification comprises:
extracting speech segments from an audio recording of the IVR portion of the call, wherein the extracted speech segments correspond to one or more IVR prompts in the call,
converting the extracted speech segments to text,
classifying each segment with an IVR state to obtain an IVR state sequence for the call, wherein each segment is automatically classified using a semantic classifier that classifies the segment with one of a plurality of predefined IVR states based on the text in the segment and the statistical semantic model for IVR prompts;
identifying the N most common IVR state sequences among the second set of calls, wherein N is greater than or equal to one; and
displaying an application flow for the IVR application using only the N most common IVR state sequences.

2. The method of claim 1, wherein the classification step for each segment further comprises:
determining a confidence level associated with the automatically-classified state;
determining if the confidence level meets a minimum threshold;
in response to the confidence level meeting the minimum threshold, using the automatically-classified state for the segment; and
in response to the confidence level not meeting the minimum threshold, designating the segment as requiring manual supervision and labeling.

3. The method of claim 2, further comprising:
providing a user interface via which a user can manually label designated segments with a state.

4. The method of claim 1, wherein a hierarchical, bisecting K-Means algorithm is used to perform the clustering.

5. The method of claim 1, wherein clustering the speech segments includes assigning weights to individual words in the speech segments and wherein transcripts with similar words are clustered together while weighing down frequently-used words.

6. The method of claim 5, wherein the frequency in which words are used is determined by building word statistics from a generic text database.

7. The method of claim 1, wherein identifying the N most common IVR state sequences comprises:
creating N clusters of call sequences, wherein calls with similar IVR state sequences are grouped together and wherein N is greater than 1;
from each cluster, selecting a state sequence that is closest to the center of the cluster; and
using the selected state sequences as the N most common IVR state sequences.

8. The method of claim 7, wherein a hierarchical, bisecting K-Means algorithm is used to perform the clustering.

9. A non-transitory computer-readable medium encoded with a computer program comprising code, that, when executed by a computer system, enables the computer system to perform the following method for generating an IVR application flow from recorded audio files of calls to or from an IVR system:
creating a statistical semantic model for IVR prompts by extracting speech segments from audio recordings of an IVR portion of a first set of calls, converting the extracted speech segments to text, clustering the speech segments based on semantic meaning, displaying the clusters in a user interface, enabling a user to label each of the clusters with an IVR state, and building a statistical semantic model based on the labeled clusters;
identifying an IVR state sequence for each of a second set of calls from recorded audio files of said calls, wherein, for each call in the second set, such identification comprises:
extracting speech segments from an audio recording of the IVR system during the call, wherein the extracted speech segments correspond to one or more IVR prompts in the call,
converting the extracted speech segments to text,
classifying each segment with an IVR state to obtain an IVR state sequence for the call, wherein each segment is automatically classified using a semantic classifier that classifies the segment with one of a plurality of predefined IVR states based on the text in the segment and the statistical semantic model for IVR prompts;
identifying the N most common IVR state sequences among the second set of calls, wherein N is greater than or equal to one; and
displaying an application flow for the IVR application using only the N most common IVR state sequences.

10. The non-transitory computer-readable medium encoded with the computer program of claim 9, wherein the classification step for each segment further comprises:

determining a confidence level associated with the automatically-classified state;

determining if the confidence level meets a minimum threshold;

in response to the confidence level meeting the minimum threshold, using the automatically-classified state for the segment; and in response to the confidence level not meeting the minimum threshold, designating the segment as requiring manual supervision and labeling.

11. The non-transitory computer-readable medium encoded with the computer program of claim 10, further comprising:

providing a user interface via which a user can manually label designated segments with a state.

12. The non-transitory computer-readable medium encoded with the computer program of claim 9, wherein a hierarchical, bisecting K-Means algorithm is used to perform the clustering.

13. The non-transitory computer-readable medium encoded with the computer program of claim 9, wherein clustering the speech segments includes assigning weights to individual words in the speech segments and wherein transcripts with similar words are clustered together while weighing down frequently used words.

14. The non-transitory computer-readable medium encoded with the computer program of claim 13, wherein the frequency in which words are used is determined by building word statistics from a generic text database.

15. The non-transitory computer-readable medium encoded with the computer program of claim 9, wherein identifying the N most common IVR state sequences comprises:

creating N clusters of call sequences, wherein calls with similar IVR state sequences are grouped together and wherein N is greater than 1;

from each cluster, selecting a state sequence that is closest to the center of the cluster; and using the selected state sequences as the N most common IVR state sequences.

16. The non-transitory computer-readable medium encoded with the computer program of claim 15, wherein a hierarchical, bisecting K-Means algorithm is used to perform the clustering.

17. A computer system for automatically generating an IVR application flow from recorded audio files of calls to or from an IVR system, the system comprising:

a processor;

a memory coupled to the processor, wherein the memory stores instructions that, when executed by the processor, cause the system to perform the operations of:

creating a statistical semantic model for IVR prompts by extracting speech segments from audio recordings of an IVR portion of a first set of calls, converting the extracted speech segments to text, clustering the speech segments based on semantic meaning, displaying the clusters in a user interface, enabling a user to label each of the clusters with an IVR state, and building a statistical semantic model based on the labeled clusters;

identifying an IVR state sequence for each of a second set of IVR calls from recorded audio files of said calls, wherein, for each call in the second set, such identification comprises:

extracting speech segments from an audio recording of an IVR system during the call, wherein the extracted speech segments correspond to one or more IVR prompts in the call, converting the extracted speech segments to text, classifying each segment with an IVR state to obtain an IVR state sequence for the call, wherein each segment is automatically classified using a semantic classifier that classifies the segment with one of a plurality of predefined IVR states based on the text in the segment and the statistical semantic model for IVR prompts;

identifying the N most common IVR state sequences among the second set of calls, wherein N is greater than or equal to one; and displaying an application flow for the IVR application using only the N most common IVR state sequences.

* * * * *